Patented Jan. 26, 1937

2,068,800

UNITED STATES PATENT OFFICE 2,068,800

INDOL SULPHONIC ACIDS

Ernst Herdieckerhoff, Opladen, and Eduard Tschunkur, Cologne-Mulheim, Germany, assignors to General Aniline Works, Inc., New York, N. Y., a corporation of Delaware No Drawing. Application March 3, 1932, Serial No. 596,666. In Germany March 19, 1931

15 Claims. (Cl. 260—47)

The present invention relates to a process of preparing indol-sulphonic acids and to the new compounds obtainable thereby, more particularly it relates to compounds of the probable general formula:

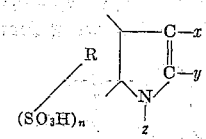

wherein

stands for aryl, such as a benzene or naphthalene radical, "$x$" stands for hydrogen or an alkyl group, such as methyl, ethyl, isopropyl and the like, "$y$" and "$z$" stand for alkyl, such as methyl, ethyl, propyl, or for aryl, such as a radical of the benzene or naphthalene series, "$n$" stands for one of the numbers one and two, and wherein all nuclei may be substituted, for example, by alkyl, alkyloxy, the nitro group, the amino group and halogen.

The process is carried out by heating in an inert solvent or diluent about molecular quantities of an arylhydrazine-sulphonic acid, such as a phenylhydrazine- or a naphthylhydrazine-mono- or -disulphonic acid, which hydrazine-sulphonic acids may be substituted in the benzene or naphthalene nuclei, for example, by alkyl, alkoxy, halogen, the nitro and the amino group, and in the imino group by alkyl or aryl, and a ketone of the general formula:

$$R'—CH_2—CO—R''$$

wherein "$R'$" stands for hydrogen or alkyl, and "$R''$" stands for alkyl or for aryl, such as a radical of the benzene of naphthalene series, thereby providing an acid reaction in the reaction mixture.

The process can be carried out in an aqueous medium or in an inert organic solvent, such as ethyl-alcohol. The acid reaction produced by the hydrazine-sulphonic acid is sufficient for performing the process, but it may be also carried out with the addition of a suitable strong acid, such as inorganic acids, for instance, hydrochloric acid, sulphuric acid and phosphoric acid, or sulphonic acids, for example, naphthalene-sulphonic acids. Further the acid reaction may be produced or increased by the addition of suitable acid salts, for instance, sodium bisulphate or sodium bisulphite. It is self-evident that acids causing by-reactions, such as nitric acid, do not come into consideration for the purpose of the invention.

Instead of starting with the free hydrazine-sulphonic acids there may be started with a water soluble salt thereof, in which case the reaction mixture is to be acidified by the addition of an acid.

The temperature required somewhat depends on the specific ketones used. Thus, when working with ketones containing in the vicinal position to the carbonyl group a methylene group which takes part in the reaction, such as diethylketone or propylphenylketone, temperatures of about 90–100° C. are sufficient, while for such ketones containing a methyl group taking part in the reaction somewhat higher temperatures are required, for example, in case of the dimethyl-ketone the process can be carried out at 120–130° C., while 140–160° C. is a suitable temperature for acetophenone.

The process is complete after several hours, and the indol-sulphonic acids formed either separate after cooling in form of their ammonium salts or are isolated after neutralizing the reaction mixture with a suitable alkali. Otherwise the indol-sulphonic acids formed can be separated by the addition of a suitable salt, such as an alkali metal or an alkaline earth metal salt.

The whole process may be represented by the following scheme:

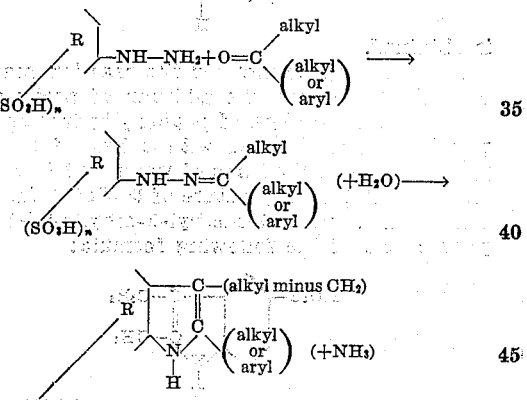

The new indol-sulphonic acids are well-crystallizing, colorless to yellowish substances, form well-crystallizing alkali metal salts and are valuable intermediate products in the manufacture of dyestuffs.

The invention is illustrated by the following examples, without being restricted thereto:

*Example 1.*—24 kgs. of 1-naphthylhydrazine-7-sulphonic acid are suspended in about 250 kgs. of acetic acid of 10% strength and combined with 8 kgs. of methylethylketone. The mixture is heated for 1 to 2 hours at a temperature of 90–95° C., while stirring from time to time. After a short time solution occurs. On the addition of soda lye the 2,3-dimethylnaphthindol-8-sulphonic acid of the following formula:

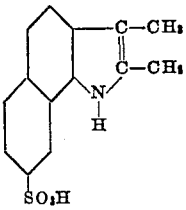

crystallizes in form of the sodium salt in beautiful crystals. The yield is quantitative.

By substituting the methylethylketone by 9 kgs. of diethylketone the 2-ethyl-3-methyl-naphthindol-8-sulphonic acid is obtained.

*Example 2.*—19 kgs. of o-phenylhydrazine-sulphonic acid are heated together with 8 kgs. of methylethylketone in 120 litres of acetic acid (10%) at a temperature of 90–95° C. The 2,3-dimethylindol-7-sulphonic acid of the following formula:

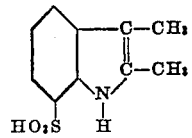

is obtained in a good yield.

On replacing the o-phenylhydrazine-sulphonic acid, by the 2,5-phenylhydrazine-disulphonic acid, the 2,3-dimethylindol-4,7-disulphonic acid is obtained.

*Example 3.*—19 kgs. of m-phenylhydrazine-sulphonic acid are condensed with 9 kgs. of diethylketone as described in Example 2. The 2-ethyl-3-methylindol-6-sulphonic acid of the following formula:

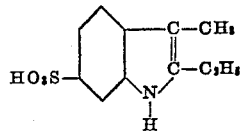

is obtained.

In an analogous manner the reaction may be carried out without the addition of acetic acid.

*Example 4.*—19 kgs. of p-phenylhydrazine-sulphonic acid are heated with 9 kgs. of methylpropylketone in 120 litres of water and 10 kgs. of oxalic acid at a temperature of 90–95° C. for several hours. The 2-methyl-3-ethylindol-5-sulphonic acid of the following formula:

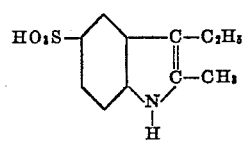

is obtained. In view of the high solubility of the alkali salts the new compound is isolated in form of its barium salt by the addition of barium chloride.

*Example 5.*—12 kgs. of 1-naphthylhydrazine-7-sulphonic acid are heated for several hours with 120 kgs. of acetic acid (10%) and 6 kgs. of acetophenone at a temperature of 130–150° C. under pressure. The 2-phenylnaphthindol-8-sulphonic acid of the following formula:

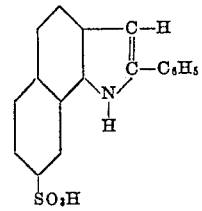

is obtained in a good yield.

On replacing the acetophenone by ethyl-phenylketone, the 2-phenyl-3-methylnaphthindol-8-sulphonic acid, by replacing it by methyl-α-naphthylketone the 2-naphthyl-α-naphthindol-8-sulphonic acid is obtained.

In an analogous manner the reaction may be carried out without the addition of acetic acid.

*Example 6.*—12 kgs. of 1-naphthylhydrazine-7-sulphonic acid are heated for several hours with 120 kgs. of acetic acid (10%) and 4 kgs. of acetone at a temperature of 120–130° C. under pressure. The 2-methyl-α-naphthindol-8-sulphonic acid of the following formula:

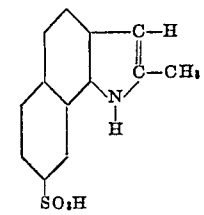

is thus obtained in a good yield.

*Example 7.*—22 kgs. of 2-chlorophenylhydrazine-4-sulphonic acid are heated for a short time with 8 kgs. of methylethylketone in 120 litres of acetic acid (10%) at a temperature of 100° C. The 2,3-dimethyl-7-chlorindol-5-sulphonic acid of the following formula:

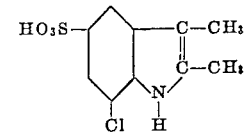

is thus obtained.

On replacing the 2-chlorophenylhydrazine-4-sulphonic acid by the 2-nitro- or 2-amino-phenylhydrazine-4-sulphonic acid respectively the corresponding 2,3-dimethyl-7-nitro- or 7-amino-indol-5-sulphonic acid is obtained.

*Example 8.*—20 kgs. of 2-tolylhydrazine-5-sulphonic acid are heated with 9 kgs. of diethylketone in 120 litres of water at a temperature of 100° C. The 2-ethyl-3,7-dimethylindol-4-sulphonic acid of the following formula:

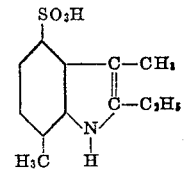

is obtained.

By substituting the 2-tolylhydrazine-5-sulphonic acid by the 2-hydroxy-, 2-methoxy- or 2-carboxy-phenylhydrazine-5-sulphonic acid the corresponding 2-ethyl-3-methyl-7-hydroxy- or 7-methoxy- or 7-carboxy- respectively indol-4-sulphonic acid is obtained in a good yield.

*Example 9.*—28 kgs. of phenyl-α-benzylhydrazine-2-sulphonic acid and 8 kgs. of methylethylketone are heated in 250 litres of a 10% aqueous acetic acid for several hours at 100° C. The 1-benzyl-2,3-dimethylindol-7-sulphonic acid of the formula:

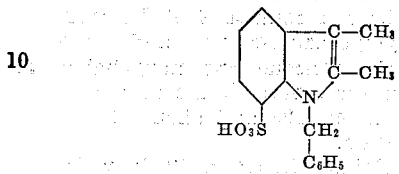

is thus obtained.

*Example 10.*—By heating 27 kgs. of 1-(α-ethyl-)naphthylhydrazine-7-sulphonic acid and 9 kgs. of diethylketone in 300 kgs. of a 10% acetic acid for 2 hours at a temperature of 100° C. the 1,2-diethyl-3-methyl-α-naphthindol-8-sulphonic acid of the formula:

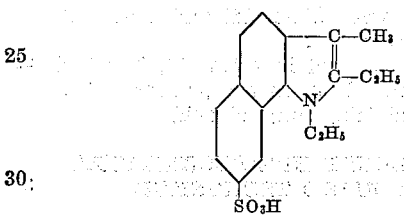

is thus obtained.

We claim:

1. The process which comprises heating about molecular quantities of 1-naphthylhydrazine-7-sulphonic acid and methylethylketone in aqueous suspension for 1 to 2 hours at a temperature between about 90 and about 95° C. in the presence of acetic acid as solvent.

2. The process which comprises heating about molecular quantities of 1-naphthylhydrazine-7-sulphonic acid and acetophenone in aqueous suspension for several hours at a temperature between about 130 and about 150° C. in the presence of acetic acid as solvent.

3. The process which comprises heating about molecular quantities of 1-naphthylhydrazine-7-sulphonic acid and acetone in aqueous suspension for several hours at a temperature between about 120 and about 130° C. in the presence of acetic acid as solvent.

4. As new products naphthindol-sulphonic acids of the general formula:

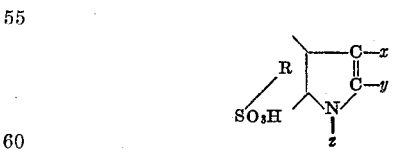

wherein

stands for a radical of the naphthalene series, "$x$" stands for a member of the group consisting of hydrogen and methyl, $y$ stands for a radical of the group consisting of alkyl and radicals of the benzene and naphthalene series and $z$ stands for a member of the group consisting of hydrogen and ethyl, being generally colorless to yellowish, well crystallizing substances, and being valuable intermediate products in the manufacture of dyestuffs.

5. As new products naphthindol-sulphonic acids of the general formula:

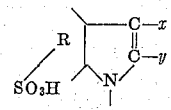

wherein

stands for a radical of the naphthalene series, "$x$" stands for methyl, $y$ stands for a member of the group consisting of alkyl and phenyl and $z$ stands for a member of the group consisting of hydrogen and ethyl, being generally colorless to yellowish, well crystallizing substances, and being valuable intermediate products in the manufacture of dyestuffs.

6. As a new product the 2.3-dimethylnaphthindol-8-sulphonic acid of the following formula:

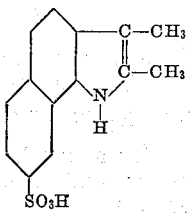

forming well-crystallizing alkali metal salts and being a valuable intermediate product in the manufacture of dyestuffs.

7. As a new product the 2-phenylnaphthindol-8-sulphonic acid of the formula:

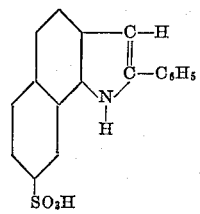

forming well-crystallizing alkali metal salts and being a valuable intermediate product in the manufacture of dyestuffs.

8. As a new product the 2-methyl-α-naphthindol-8-sulphonic acid of the following formula:

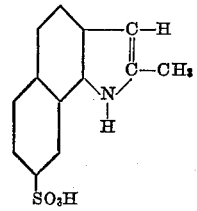

forming well-crystallizing alkali metal salts and being a valuable intermediate product in the manufacture of dyestuffs.

9. The process which comprises heating about molecular quantities of a compound of the group consisting of arylhydrazine-mono- and disulphonic acids of the benzene and naphthalene series and a ketone of the formula $$R'-CH_2-CO-R'',$$

wherein R' stands for a member of the group consisting of hydrogen and alkyl and R'' for a radical of the group consisting of alkyl and radicals of the benzene and naphthalene series, for several hours at a temperature between about 90 and about 160° C. in a liquid medium which is inert to the compounds present.

10. The process for the production of indol-sulphonic acids which comprises heating about molecular quantities of a compound of the group consisting of arylhydrazine-mono- and disulphonic acids of the benzene and naphthalene series and a ketone of the formula

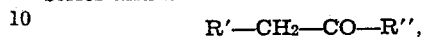

wherein R' stands for a member of the group consisting of hydrogen and alkyl and R'' for a radical of the group consisting of alkyl and radicals of the benzene and naphthalene series, for several hours at a temperature between about 90 and about 160° C. in a liquid medium inert to the compounds present and in the presence of an inorganic non-oxidizing mineral acid.

11. The process for the production of indol-sulphonic acids which comprises heating about molecular quantities of a compound of the group consisting of arylhydrazine-mono- and disulphonic acids of the benzene and naphthalene series and a ketone of the formula

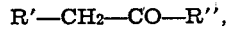

wherein R' stands for a member of the group consisting of hydrogen and alkyl and R'' for a radical of the group consisting of alkyl and radicals of the benzene and naphthalene series, for several hours at a temperature between about 90 and about 160° C. in a liquid medium, inert to the compounds present, in the presence of an inorganic non-oxidizing mineral acid.

12. The process for the production of indol-sulphonic acids which comprises heating about molecular quantities of a compound of the group consisting of arylhydrazine-mono- and disulphonic acids of the benzene and naphthalene series and acetone for several hours at a temperature between about 120 and about 130° C. in aqueous suspension.

13. Process as claimed in claim 12, in which the process is carried out in the presence of an inorganic non-oxidizing mineral acid.

14. The process for the production of indol-sulphonic acids which comprises heating about molecular quantities of a compound of the group consisting of arylhydrazine-mono- and disulphonic acids of the benzene and naphthalene series and acetophenone for several hours at a temperature between about 140 and about 160° C. in aqueous suspension.

15. Process as claimed in claim 14, in which the process is carried out in the presence of an inorganic non-oxidizing mineral acid.

ERNST HERDIECKERHOFF.
EDUARD TSCHUNKUR.